US012681532B2

(12) United States Patent

Volcy, Jr.

(10) Patent No.: US 12,681,532 B2
(45) Date of Patent: Jul. 14, 2026

(54) MULTI-PORT INTERFACE DEVICE

(71) Applicant: Jean Volcy, Jr., Jamaica, NY (US)

(72) Inventor: Jean Volcy, Jr., Jamaica, NY (US)

( * ) Notice: Subject to any disclaimer, the term of this patent is extended or adjusted under 35 U.S.C. 154(b) by 92 days.

(21) Appl. No.: 18/653,557

(22) Filed: May 2, 2024

(65) Prior Publication Data

US 2025/0341864 A1      Nov. 6, 2025

(51) Int. Cl.
*G06F 1/16*       (2006.01)
*G06V 40/12*      (2022.01)
*G06V 40/13*      (2022.01)
*H04W 4/029*      (2018.01)

(52) U.S. Cl.
CPC ........ *G06F 1/1632* (2013.01); *G06V 40/1318* (2022.01); *G06V 40/1365* (2022.01); *H04W 4/029* (2018.02)

(58) Field of Classification Search
CPC .... G06F 1/1632; G06F 1/1656; G06F 1/1683; G06F 1/1684; G06F 1/1698; G06F 1/266
See application file for complete search history.

(56) References Cited

U.S. PATENT DOCUMENTS

| | | | |
|---|---|---|---|
| 6,581,122 B1 | 6/2003 | Sarat | |
| 6,681,991 B1 | 1/2004 | Li | |
| 6,976,623 B1 | 12/2005 | Mambakkam | |
| 7,337,259 B2 | 2/2008 | Lee | |
| 10,289,152 B1 * | 5/2019 | Cheng | G06F 1/1684 |
| D883,984 S * | 5/2020 | Zhang | D14/433 |
| 2002/0097142 A1 * | 7/2002 | Janiak | G07C 9/38 |
| | | | 340/5.6 |
| 2002/0171999 A1 | 11/2002 | Huang | |
| 2003/0191882 A1 | 10/2003 | Chang | |
| 2010/0067197 A1 * | 3/2010 | Guccione | G06F 1/1632 |
| | | | 361/728 |
| 2011/0202692 A1 | 8/2011 | Chang | |
| 2017/0276289 A1 * | 9/2017 | Phillips | E05B 65/00 |
| 2020/0091746 A1 * | 3/2020 | Chien | G06F 1/266 |
| 2023/0175643 A1 * | 6/2023 | Bustamante | G06F 1/1632 |
| | | | 248/472 |
| 2024/0102603 A1 * | 3/2024 | Hong | F16M 13/02 |

FOREIGN PATENT DOCUMENTS

| | | |
|---|---|---|
| CN | 202186206 | 4/2012 |

* cited by examiner

*Primary Examiner* — Anthony Q Edwards

(57)               ABSTRACT

A multi-port interface device for connecting multiple computing devices for data and power transfer includes a housing with an internal power source. A processor is electrically coupled to the internal power source. A power input port electrically coupled to the internal power source is designed to receive a power cord. The power cord is electrically couplable to an extrinsic power source to transfer power from the extrinsic power source to the internal power source. A plurality of ports electrically coupled to the processor is inset into the housing. Each port of the plurality of ports is exposed within the housing. The plurality of ports includes a plurality of universal serial bus ports and a memory card port.

12 Claims, 8 Drawing Sheets

MULTI-PORT INTERFACE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to data storage devices and more particularly pertains to a new data storage device for connecting multiple computing devices for data and power transfer.

(2) Description of Related Art Including Information Disclosed Under 37 CFR 1.97 and 1.98

The prior art relates to data storage devices. For example, data storage devices are used to store data and information on computing devices such as laptops, tablets, cell phones, and computers. Data storage devices are also used to transfer data and information between computing devices. Each computing device typically includes one or two ports to enable a wired connection between computing devices. For example, a cell phone typically has a single port that can receive a charging or data transfer cable. A desktop computer typically has one or two ports for receiving charging or data transfer cables. However, many individuals have multiple computing devices, such as a desktop, a laptop, a tablet, and a cell phone. Businesses typically have even more, to enable the individuals working for the business to stay connected with each other. Thus, there is a need for a data storage and transfer device that can connect many computing devices together. Ideally, such a device would enable both wired and wireless connectivity. Such a device would be particularly useful if the device could also recharge the batteries on each of the computing devices.

BRIEF SUMMARY OF THE INVENTION

An embodiment of the disclosure meets the needs presented above by generally comprising a housing. An internal power source is coupled to the housing. A processor is electrically coupled to the internal power source. A power input port is electrically coupled to the internal power source. The power input port is configured to receive a power cord. The power cord is configured to be electrically couplable to an extrinsic power source wherein the power cord is configured to transfer power from the extrinsic power source to the internal power source. A plurality of ports is electrically coupled to the processor. Each port of the plurality of ports is inset into the housing. Each port of the plurality of ports is exposed within the housing. The plurality of ports includes a plurality of universal serial bus ports that are each configured to receive a universal serial bus wherein each universal serial bus port of the plurality of universal serial bus ports is configured to electrically couple the processor to a respective external computing device of a plurality of external computing devices. A memory card port is configured to receive a memory card wherein the memory card port is configured to electrically couple the processor to the memory card.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
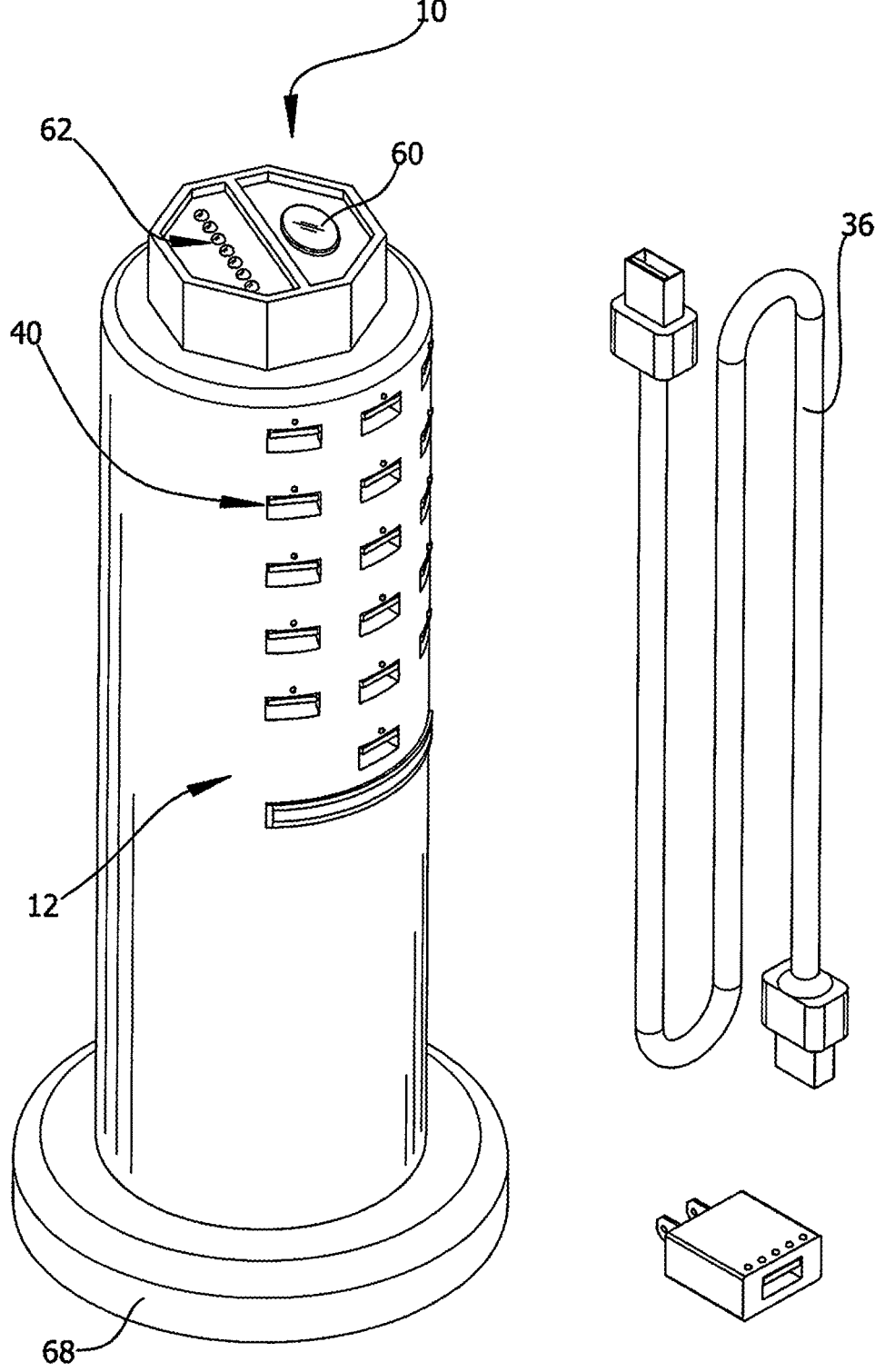
FIG. 1 is a perspective view of a multi-port interface device according to an embodiment of the disclosure.

With reference now to the drawings, and in particular to FIGS. 1 through 8 thereof, a new data storage device embodying the principles and concepts of an embodiment of the disclosure and generally designated by the reference numeral 10 will be described.

As best illustrated in FIGS. 1 through 8, the multi-port interface device 10 generally comprises a housing 12. The housing 12 may have a top end 14, a bottom end 16, and a body 18 that is coupled to and extends between the top end 14 and the bottom end 16. The housing 12 may have a front side 20 and a back side 22. The body 18 may be elongated. For example, the body 18 may have a height between 7.5 inches and 9.5 inches and a diameter between 2.5 inches and 4.5 inches. In such embodiments, the housing 12 may be configured to fit within a cup holder. The housing 12 may be cylindrical. Alternatively, the housing 12 is octagonal, hexagonal, or another shape that fits within the cup holder. The housing 12 generally comprises a heat resistant material that is configured to inhibit the housing 12 from overheating. For example, the heat resistant material may include aluminum, carbon fiber, or combinations thereof.

An internal power source 24 is coupled to the housing 12. The internal power source 24 may be positioned within the body 18. For example, the internal power source 24 may comprise a battery. The battery may be rechargeable. A processor 26 is electrically coupled to the internal power source 24. The processor 26 may be positioned within the body 18 of the housing 12.

A power input port 34 may be electrically coupled to the internal power source 24. The power input port 34 is generally configured to receive a power cord 36. The power cord 36 is configured to be electrically couplable to an extrinsic power source 88, such as the power outlet shown in FIG. 7. The power cord 36 is configured to transfer power from the extrinsic power source 88 to the internal power source 24. The power input port 34 may be positioned on the back side 22 of the housing 12. The power input port 34 may be positioned proximate to the top end 14 of the housing 12.

A power input indicator light 38 may be electrically coupled to the processor 26. The power input indicator light 38 is electrically coupled to the power input port 34. The processor 26 is configured to turn the power input indicator light 38 on when the power input port 34 receives the power cord 36 and when the power cord 36 is electrically coupled to the extrinsic power source 88. The power input indicator light 38 is thus configured to visually indicate that power is being transferred from the extrinsic power source 88 to the internal power source 24. The power input indicator light 38 may be positioned above the power input port 34. For example, the power input indicator light 38 may be centered above the power input port 34. The power input indicator light 38 may be spaced from the power input port 34 wherein the power indicator light is visible when the power input port 34 receives the power cord 36.

A wireless communication transceiver 28 may be electrically coupled to the processor 26. The wireless communication transceiver 28 may be positioned within the body 18 of the housing 12. The wireless communication transceiver 28 is generally configured to wirelessly communicate with an electronic device 30 wherein the wireless communication transceiver 28 is configured to facilitate file sharing between the processor 26 and the electronic device 30. The electronic device 30 may be a computer, a tablet, a cell phone, or another device that is capable of wireless communication. This group, or list, of electronic devices 30 is not considered exhaustive, and may include any other electronic devices 30 which store files and data such as photographs, videos, audio files, and documents.

A global positioning system transceiver 32 may be electrically coupled to the processor 26. The global positioning system transceiver 32 is configured to wirelessly communicate with a global positioning system unit 86 wherein the global positioning system transceiver 32 is configured to identify a geographic location of the housing 12. The global positioning system transceiver 32 may be positioned within the housing 12.

A plurality of ports 40 is electrically coupled to the processor 26. The plurality of ports 40 may be positioned on the front side 20 of the housing 12. For example, each port of the plurality of ports 40 may be inset into the front side 20 of the housing 12. Each port of the plurality of ports 40 may be exposed within the front side 20 of the housing 12. The plurality of ports 40 generally includes a plurality of universal serial bus ports 42 and a memory card port 52.

Each of the plurality of universal serial bus ports 42 is configured to receive a universal serial bus, such as a universal serial bus cable or a universal serial bus flash drive. Each universal serial bus port of the plurality of universal serial bus ports 42 is configured to electrically couple the processor 26 to a respective external computing device of a plurality of external computing devices 44. For example, the plurality of external computing devices 44 may include one or more of a computer, a tablet, a smartphone, a camcorder, a digital camera, a flash drive, or an external global positioning system unit 86. This group, or list, of external computing devices is not considered exhaustive, and may include any other external devices which can be connected using a universal serial bus cable, device, or plug.

Each universal serial bus port of the plurality of universal serial bus ports 42 may be configured to facilitate file sharing between the processor 26 and the respective external computing device 44. For example, the plurality of universal serial bus ports 42 may be configured to facilitate moving files, documents, data, and information between the processor 26 and the respective external computing device 44. The plurality of universal serial bus ports 42 may be configured to facilitate moving files, documents, data, and information between two or more respective external computing devices of the plurality of external computing devices 44, for example when multiple external computing devices 44 are connected to the plurality of universal serial bus ports 42.

Each universal serial bus port of the plurality of universal serial bus ports 42 may be configured to facilitate power transfer from the internal power source 24 to the respective external computing device 44. For example, each universal serial bus port of the plurality of universal serial bus ports 42 may facilitate recharging the respective external computing device 44. Multiple external computing devices 44 may be electrically coupled to the internal power source 24 via the plurality of universal serial bus ports 42, facilitating simultaneous charging of the multiple external computing devices 44.

Figure 2:
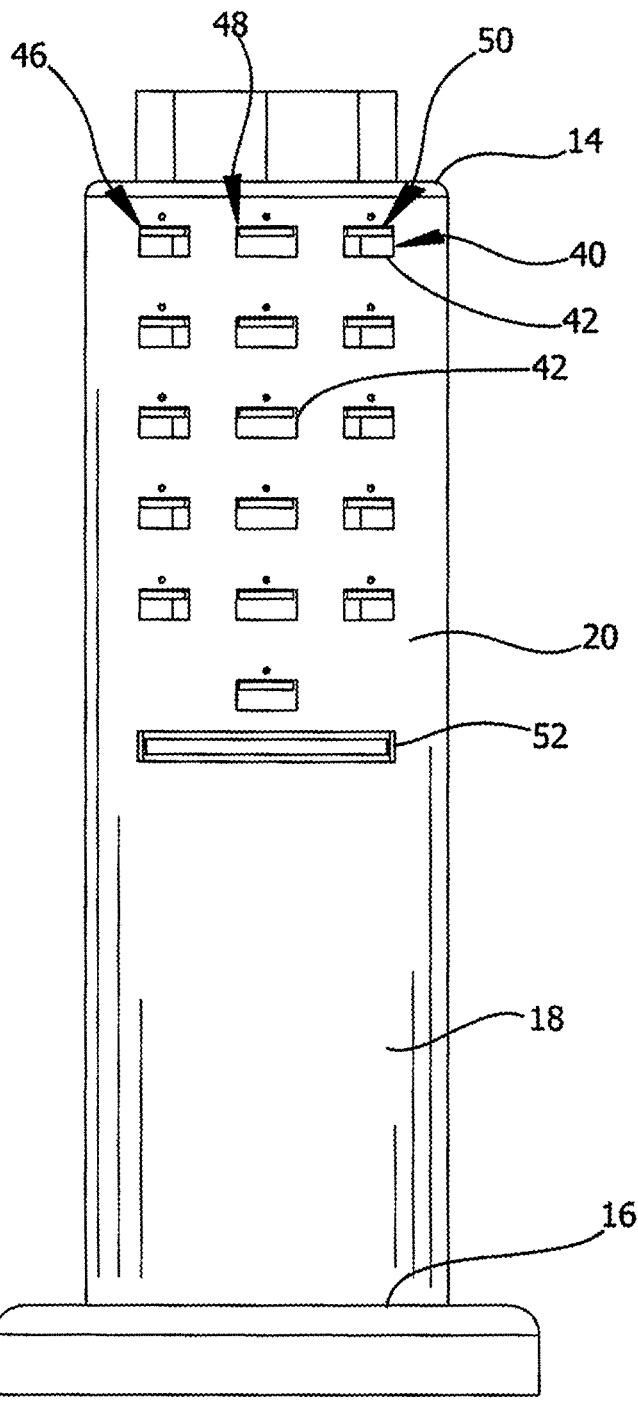
FIG. 2 is a front view of an embodiment of the disclosure.
Figure 3:
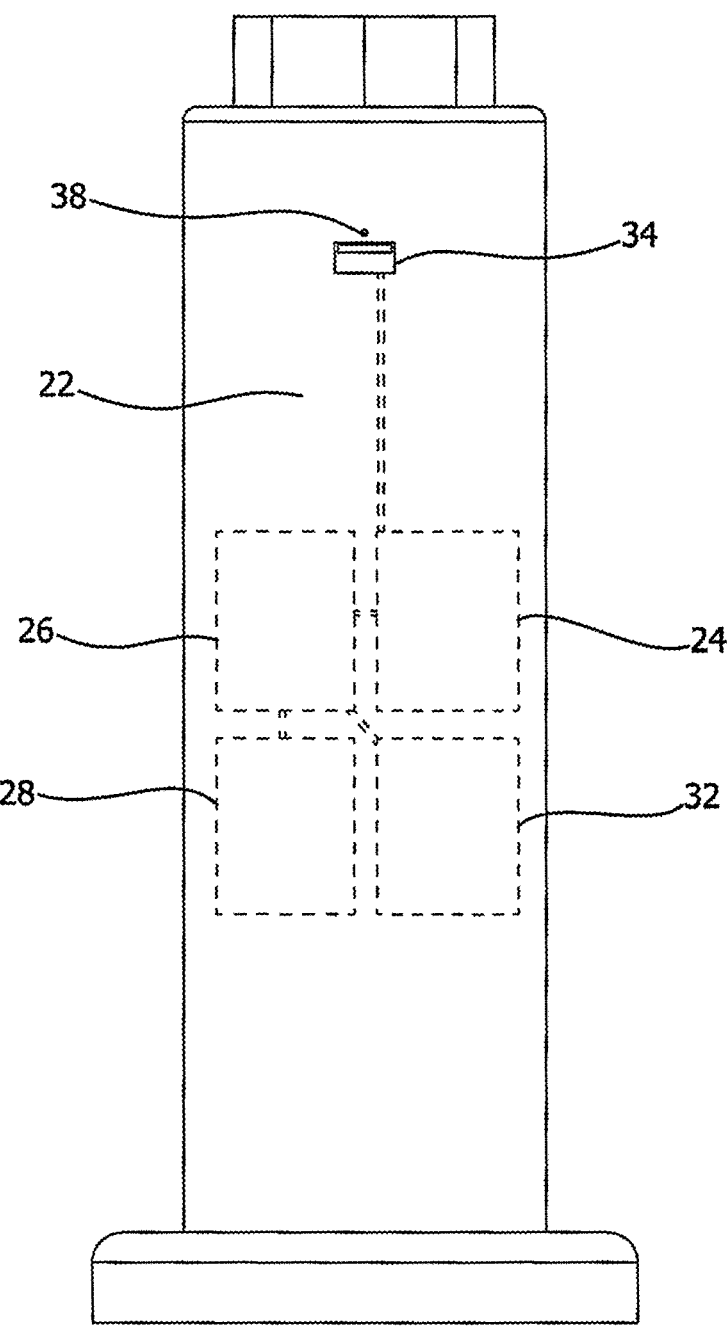
FIG. 3 is a rear view of an embodiment of the disclosure.

The plurality of universal serial bus ports 42 may be aligned with each other on the front side 20 of the housing 12. The plurality of universal serial bus ports 42 may be spaced from the bottom end 16 of the housing 12. As shown in FIG. 2, the plurality of universal serial bus ports 42 may be arranged in three column 78s that each extend downwardly along the body 18. In one exemplary embodiment, a first column 78 46 of the three column 78s may include five universal serial bus ports of the plurality of universal serial bus ports 42. A second column 78 48 of the three column 78s may include six universal serial bus ports of the plurality of universal serial bus ports 42. A third column 78 50 of the three column 78s may include five universal serial bus ports of the plurality of universal serial bus ports 42. In such embodiments, a total of sixteen external computing devices 44 may be connected together via the plurality of universal serial bus ports 42.

The memory card port 52 is configured to receive a memory card 94 wherein the memory card port 52 is configured to electrically couple the processor 26 to the memory card 94. For example, the memory card 94 may be for a digital camera, a camcorder, a video game device, or another of the external computing devices 44 listed above. The memory card port 52 may be configured to facilitate file sharing between the processor 26 and the memory card 94, for example, to add files to or remove files from the memory card 94.

The memory card port 52 may be positioned beneath the plurality of universal serial bus ports 42. For example, the memory card port 52 may be centered beneath the three column 78s of the plurality of universal serial bus ports 42. The memory card port 52 may be spaced from the bottom end 16 of the housing 12.

A plurality of indicator lights 54 may be electrically coupled to the processor 26. Each indicator light of the plurality of indicator lights 54 may be electrically coupled to a respective universal serial bus port of the plurality of universal serial bus ports 42. The processor 26 is configured to illuminate an associated indicator light of the plurality of indicator lights 54 when the respective universal serial bus port is electrically coupled to the respective external computing device 44. The plurality of indicator lights 54 is configured to identify which universal serial bus ports of the plurality of universal serial bus ports 42 is in use. For example, the plurality of indicator lights 54 may provide visual confirmation of the connection between the respective external computing device 44 and the respective universal serial bus port of the plurality of universal serial bus ports 42, to indicate that file sharing and charging capabilities are enabled through the respective universal serial bus port of the plurality of universal serial bus ports 42.

Each indicator light of the plurality of indicator lights 54 may be positioned above the respective universal serial bus port of the plurality of universal serial bus ports 42. For example, each indicator light of the plurality of indicator lights 54 may be centered above the respective universal serial bus port of the plurality of universal serial bus ports 42. Each indicator light of the plurality of indicator lights 54 may be spaced from the respective universal serial bus port wherein each indicator light of the plurality of indicator lights 54 is visible when the respective universal serial bus port is electrically coupled to the respective external computing device 44.

Figure 4:
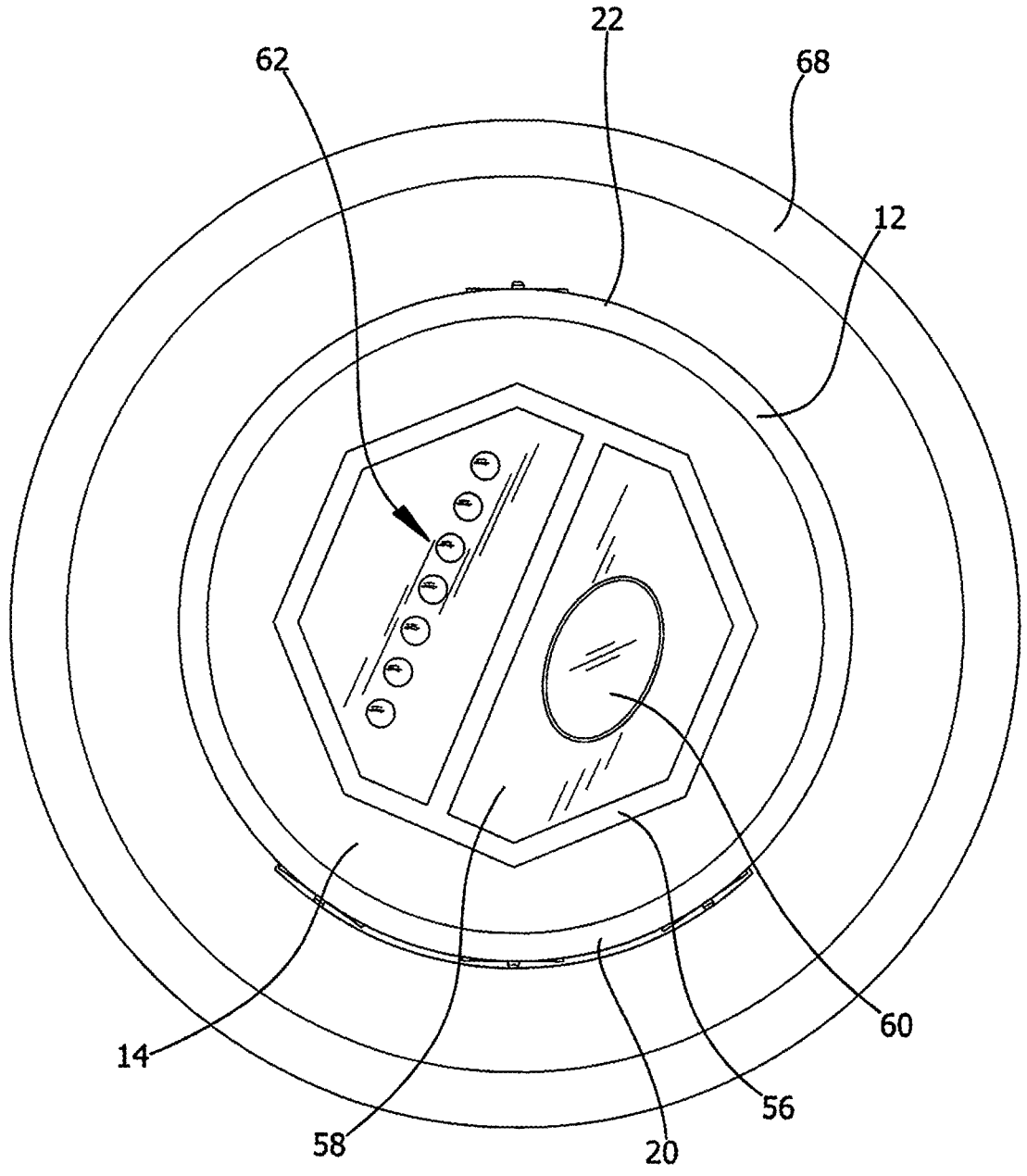
FIG. 4 is a top view of an embodiment of the disclosure.

A turret 56 may be coupled to the housing 12. The turret 56 may extend upwardly from the top end 14 of the housing 12. The turret 56 may be centrally positioned on the top end 14 of the housing 12. As shown in FIG. 4, the turret 56 may be octagonal. In other embodiments, the turret 56 may be cylindrical, hexagonal, or another shape. The turret 56 generally has an upper face 58 that is distally positioned relative to the housing 12. A lip 90 may be coupled to and extend from the upper face 58 to define sections 92 on the upper face 58. For example, the lip 90 may extend around an outer perimeter of the upper face 58, as shown in FIG. 4. The lip 90 may also extend between sides of the outer perimeter, for example to define the two sections 92 shown in FIG. 4.

A fingerprint scanner 60 may be electrically coupled to the processor 26. The fingerprint scanner 60 may be positioned on the turret 56. For example, the fingerprint scanner 60 may be positioned on upper face 58, within one of the sections 92 that is defined by the lip 90. The fingerprint scanner 60 is generally configured to capture an image of a fingerprint of a user. The processor 26 is configured to compare the image of the fingerprint with a stored fingerprint identification file. The stored fingerprint identification file generally includes the fingerprint of an authorized user. The processor 26 may be configured to inhibit file sharing when the image of the fingerprint differs from the stored fingerprint identification file wherein the fingerprint scanner 60 and the processor 26 are configured to inhibit unauthorized use or file sharing between the processor 26 and one or more of the electronic device 30, the plurality of external computing devices 44, and the memory card 94.

A set of charge capacity lights 62 may be electrically coupled to the processor 26. The set of charge capacity lights 62 is configured to provide visual indication of the amount of power available in the internal power source 24. For example, the processor 26 may be configured to turn on all of the set of charge capacity lights 62 when the internal power source 24 is fully charged. The processor 26 may be configured to selectively turn off each of the set of charge capacity lights 62 as the internal power source 24 is drained.

Figure 7:
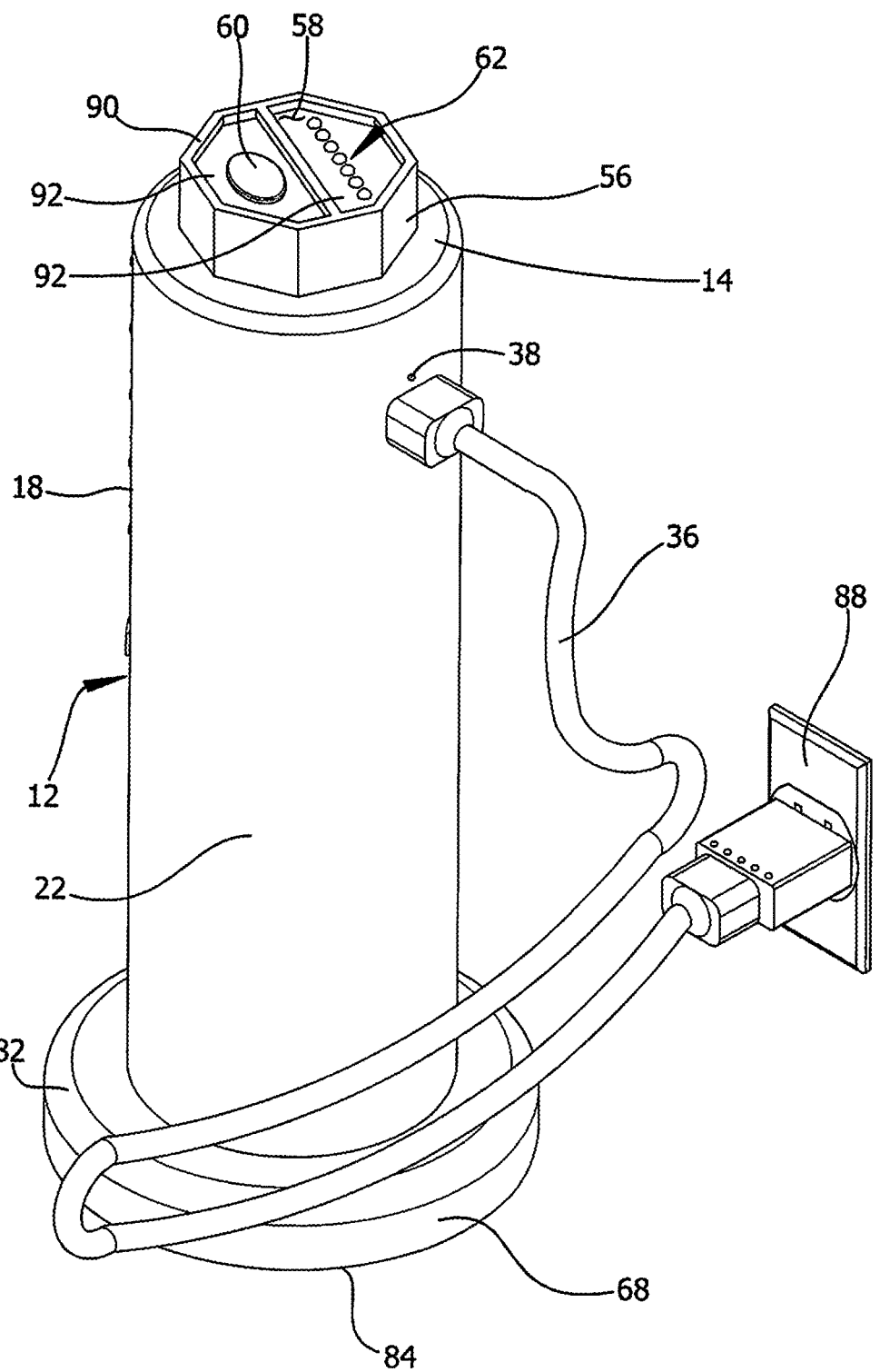
FIG. 7 is an in-use view of an embodiment of the disclosure.
Figure 8:
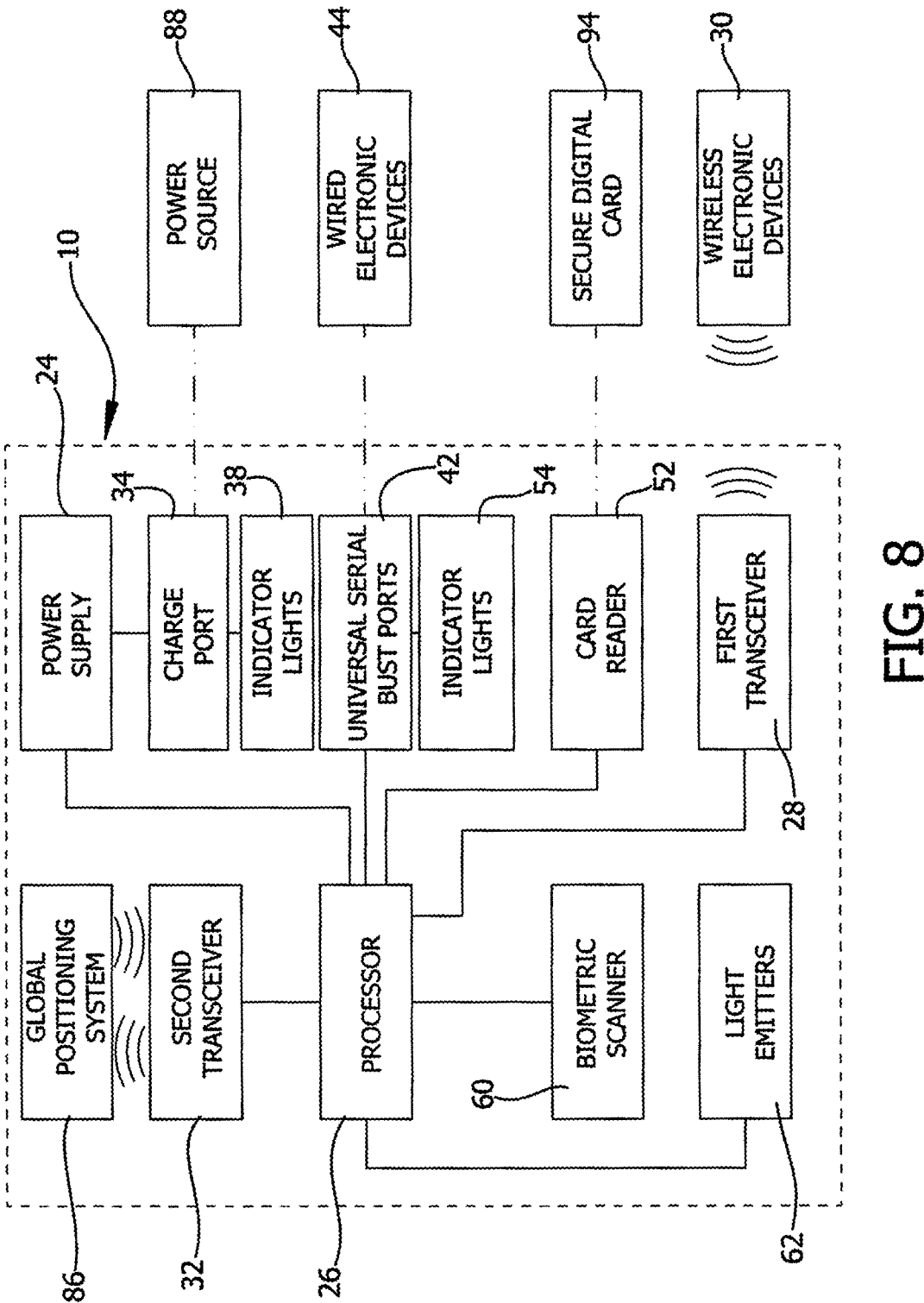
FIG. 8 is a block diagram view of an embodiment of the disclosure.

The set of charge capacity lights 62 may be aligned with each other. For example, the set of charge capacity lights 62 may be positioned on the turret 56. The set of charge capacity lights 62 may be positioned proximate to the fingerprint scanner 60. As shown in FIG. 7, the set of charge capacity lights 62 may be positioned on the upper face 58 of the turret 56, for example within one of the sections 92 defined by the lip 90.

The set of charge capacity lights 62 may be colored. For example, the set of charge capacity lights 62 may include a red light, an orange light, a yellow light, a yellow-green light, and a green light. The set of charge capacity lights 62 is arranged in that order, from the red light to the green light. The processor 26 may be configured to sequentially turn off each of the set of charge capacity lights 62 as the internal power source 24 is drained such that the processor 26 turns off the set of charge capacity lights 62 in the order of the green light, the yellow-green light, the yellow light, the orange light, and the red light.

A base 68 may be couplable with the housing 12. The base 68 may be removably positionable on the bottom end 16 of the housing 12. The base 68 may have a radius that exceeds the radius of the housing 12 wherein the base 68 is configured to stabilize a position of the housing 12 on a surface.

For example, the base 68 may include an upper wall 70, a lower wall 72, and a peripheral wall 74 that is coupled to and extends between the upper wall 70 and the lower wall 72. The lower wall 72 may be planar wherein the lower wall 72 is configured to rest on the surface when the base 68 is coupled to the housing 12.

Figure 5:
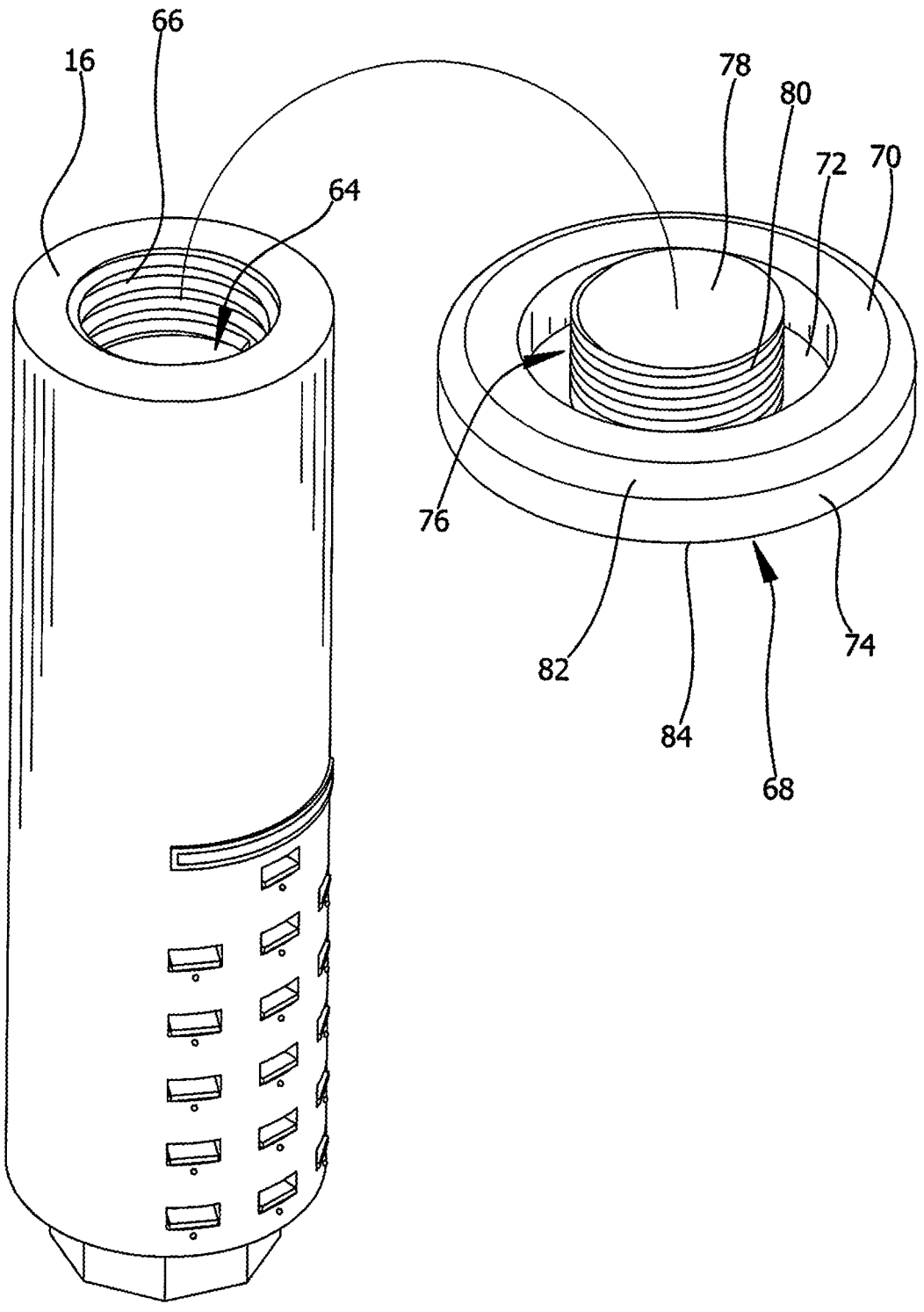
FIG. 5 is an exploded view of an embodiment of the disclosure.
Figure 6:
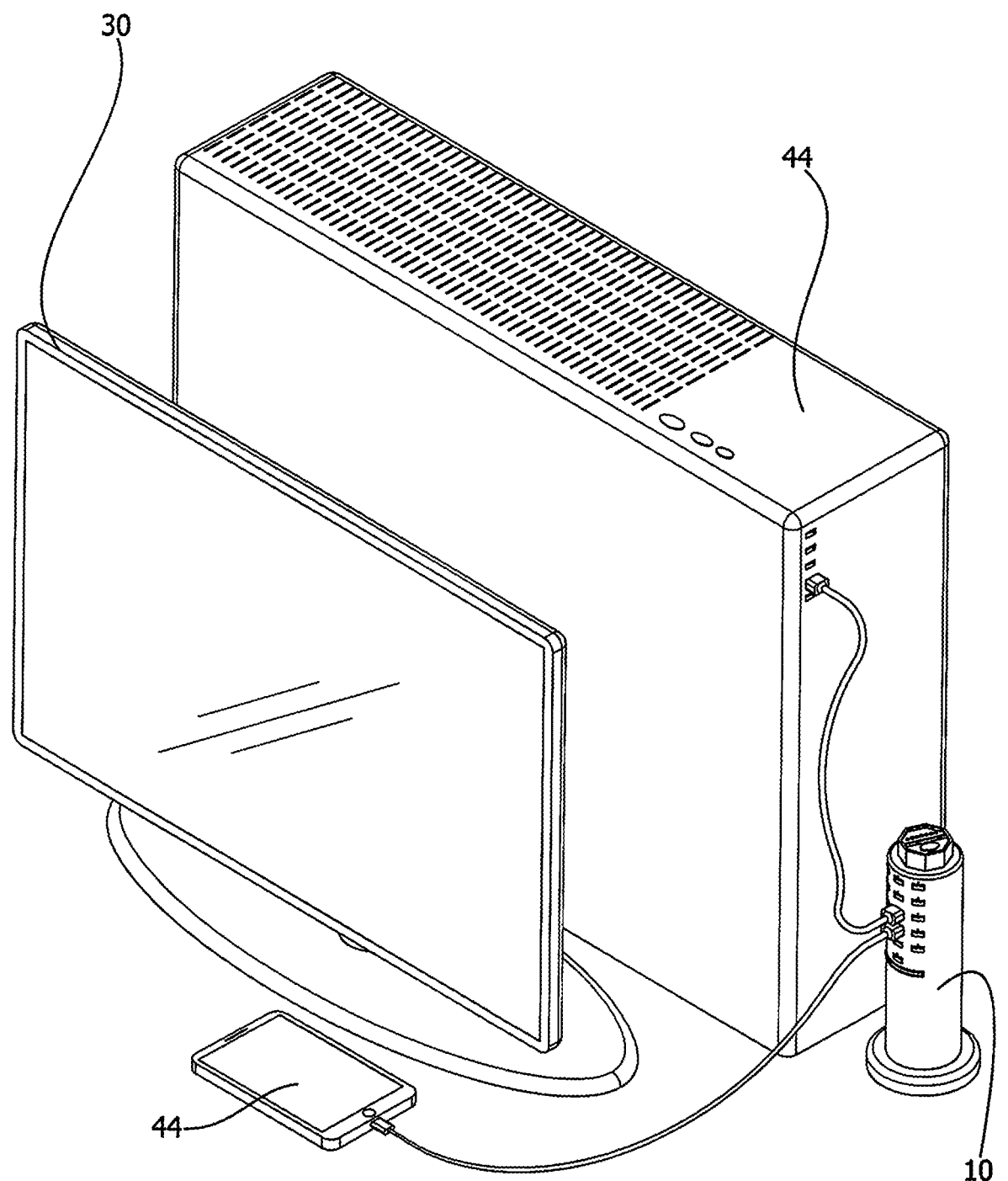
FIG. 6 is an in-use view of an embodiment of the disclosure.

A cavity 64 may extend into the bottom end 16 of the housing 12. The cavity 64 may be centered on the bottom end 16 of the housing 12, as shown in FIG. 5. A groove 76 may extend into the upper wall 70 of the base 68 to define a column 78 that is centered on the upper wall 70. The column 78 may have a radius that is complementary to a radius of the cavity 64 wherein the column 78 is positionable within the cavity 64. The groove 76 may have a shape that is complementary to a shape of the bottom end 16 of the housing 12 wherein the bottom end 16 of the housing 12 is positionable within the groove 76 when the column 78 is positioned within the cavity 64. A tight, friction fit between the groove 76, the column 78, and the bottom end 16 of the housing 12 may secure the base 68 to the housing 12.

Alternatively, the base 68 may be threadably couplable to the housing 12. For example, the cavity 64 may have a threaded inner surface 66. The column 78 may have a threaded outer surface 80. The threaded outer surface 80 is complementary to the threaded inner surface 66 of the cavity 64 wherein the base 68 is threadably couplable with the housing 12.

The base 68 may further include an upper edge 82 that is positioned between the peripheral wall 74 and the upper wall 70. The upper edge 82 may be beveled wherein the peripheral wall 74 is angled extending upwardly and inwardly toward the upper wall 70. In such embodiments, the lower wall 72 may have a radius exceeding a radius of the upper wall 70. A lower edge 84 is positioned between the peripheral wall 74 and the lower wall 72. The lower edge 84 may be squared wherein the lower wall 72 is perpendicular to the peripheral wall 74.

In use, the multi-port interface device 10 is lightweight and portable. For example, the housing 12 may have a size and shape designed to fit within a cup holder of a vehicle. The base 68 may be removed from the housing 12 to facilitate placement of the housing 12 within the cup holder. The base 68 may be coupled to the housing 12 to stabilize the housing 12 when the housing 12 is sitting on a tabletop or other surface.

A plurality of electronic devices 30 and external computing devices 44 can be connected using the wireless communication transceiver 28 and the plurality of ports 40. The wireless communication transceiver 28 enables wireless communication between the various electronic devices 30, computing devices, and the processor 26 that is positioned within the housing 12 for file sharing and data transfers. The plurality of ports 40 also enable wired communication between the plurality of electronic devices 30, the external computing devices 44, and the processor 26. In some embodiments, the plurality of ports 40 may also enable the internal power source 24 to recharge the plurality of external computing devices 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A computer connectivity hub comprising:

a housing;

an internal power source being coupled to the housing;

a processor being electrically coupled to the internal power source;

a power input port being electrically coupled to the internal power source, the power input port being configured to receive a power cord, the power cord being configured to be electrically couplable to an extrinsic power source wherein the power cord is configured to transfer power from the extrinsic power source to the internal power source;

a plurality of ports being electrically coupled to the processor, each port of the plurality of ports being inset into the housing, each port of the plurality of ports being exposed within the housing, the plurality of ports including:

a plurality of universal serial bus ports being configured to receive a universal serial bus wherein each universal serial bus port of the plurality of universal serial bus ports is configured to electrically couple the processor to a respective external computing device of a plurality of external computing devices;

a memory card port being configured to receive a memory card wherein the memory card port is configured to electrically couple the processor to the memory card;

a base being couplable to the housing, the base being removably positionable on a bottom end of the housing, the base further comprising an upper wall, a lower wall, and a peripheral wall being coupled to and extending between the upper wall and the lower wall, the lower wall being planar wherein the lower wall is configured to rest on a surface when the base is coupled to the housing and wherein the base is configured to stabilize the housing on the surface;

a cavity extending into the bottom end of the housing;

a groove extending into the upper wall to define a column being positioned on the upper wall, the column having a radius being complementary to a radius of the cavity wherein the column is positionable within the cavity; and wherein the cavity has a threaded inner surface, the column having a threaded outer surface, the threaded outer surface being complementary to the threaded inner surface of the cavity wherein the base is threadably couplable to the housing.

2. The computer connectivity hub of claim 1, further comprising a wireless communication transceiver being electrically coupled to the processor, the wireless communication transceiver being configured to wirelessly communicate with an electronic device wherein the wireless communication transceiver is configured to facilitate file sharing between the processor and the electronic device.

3. The computer connectivity hub of claim 1, further comprising a global positioning system transceiver being electrically coupled to the processor, the global positioning system transceiver being configured to wirelessly communicate with a global positioning system unit wherein the global positioning system transceiver is configured to identify a geographic location of the housing.

4. The computer connectivity hub of claim 1, further comprising a power input indicator light being electrically coupled to the processor, the power input indicator light being electrically coupled to the power input port, the processor being configured to turn the power input indicator light on when the power input port receives the power cord and when the power cord is electrically coupled to the extrinsic power source.

5. The computer connectivity hub of claim 1, wherein each universal serial bus port of the plurality of universal serial bus ports is configured to facilitate file sharing between the processor and the respective external computing device.

6. The computer connectivity hub of claim 1, wherein each universal serial bus port of the plurality of universal serial bus ports is configured to facilitate power transfer from the internal power source to the respective external computing device.

7. The computer connectivity hub of claim 1, wherein the memory card port is configured to facilitate file sharing between the processor and the memory card.

8. The computer connectivity hub of claim 1, further comprising a plurality of indicator lights being electrically coupled to the processor, each indicator light of the plurality of indicator lights being electrically coupled to a respective universal serial bus port of the plurality of universal serial bus ports, the processor being configured to illuminate an associated indicator light of the plurality of indicator lights when the respective universal serial bus port is electrically coupled to the respective external computing device.

9. The computer connectivity hub of claim 1, further comprising a fingerprint scanner being electrically coupled to the processor, the fingerprint scanner being configured to capture an image of a fingerprint of a user, the processor being configured to compare the image of the fingerprint with a stored fingerprint identification file the processor being configured to inhibit file sharing when the image differs from the stored fingerprint identification file.

10. The computer connectivity hub of claim 9, further comprising a turret being coupled to the housing, the turret extending upwardly from the housing, the fingerprint scanner being positioned on the turret.

11. The computer connectivity hub of claim 1, further comprising a set of charge capacity lights being electrically coupled to the processor, the processor being configured to turn on all of the set of charge capacity lights when the internal power source is fully charged, the processor being configured to selectively turn off each of the set of charge capacity lights as the internal power source is drained.

12. A computer connectivity hub comprising:

a housing having a top end, a bottom end, and a body being coupled to and extending between the top end and the bottom end, the body being elongated wherein the body has a height between 7.5 inches and 9.5 inches and wherein the body has a diameter between 2.5 inches and 4.5 inches, the housing being cylindrical, the housing comprising a heat resistant material being configured to inhibit the housing from overheating, the housing having a front side and a back side;

an internal power source being coupled to the housing, the internal power source being positioned within the body, the internal power source comprising a battery, the battery being rechargeable;

a processor being electrically coupled to the internal power source, the processor being positioned within the body of the housing;

a wireless communication transceiver being electrically coupled to the processor, the wireless communication transceiver being positioned within the body of the housing, the wireless communication transceiver being configured to wirelessly communicate with an electronic device wherein the wireless communication transceiver is configured to facilitate file sharing between the processor and the electronic device;

a global positioning system transceiver being electrically coupled to the processor, the global positioning system transceiver being configured to wirelessly communicate with a global positioning system unit wherein the global positioning system transceiver is configured to identify a geographic location of the housing, the global positioning system transceiver being positioned within the housing;

a power input port being electrically coupled to the internal power source, the power input port being configured to receive a power cord, the power cord being configured to be electrically couplable to an extrinsic power source wherein the power cord is configured to transfer power from the extrinsic power source to the internal power source, the power input port being positioned on the back side of the housing, the power input port being positioned proximate to the top end of the housing;

a power input indicator light being electrically coupled to the processor, the power input indicator light being electrically coupled to the power input port, the processor being configured to turn the power input indicator light on when the power input port receives the power cord and when the power cord is electrically coupled to the extrinsic power source, the power input indicator light being positioned above the power input port, the power input indicator light being centered above the power input port, the power input indicator light being spaced from the power input port wherein the power indicator light is visible when the power input port receives the power cord;

a plurality of ports being electrically coupled to the processor, the plurality of ports being positioned on the front side of the housing, each port of the plurality of ports being inset into the front side of the housing, each port of the plurality of ports being exposed within the front side of the housing, the plurality of ports including:

a plurality of universal serial bus ports being configured to receive a universal serial bus wherein each universal serial bus port of the plurality of universal serial bus ports is configured to electrically couple the processor to a respective external computing device of a plurality of external computing devices, each universal serial bus port of the plurality of universal serial bus ports being configured to facilitate file sharing between the processor and the respective external computing device, each universal serial bus port of the plurality of universal serial bus ports being configured to facilitate power transfer from the internal power source to the respective external computing device, the plurality of universal serial bus ports being aligned with each other on the front side of the housing, the plurality of universal serial bus ports being spaced from the bottom end of the housing;

a memory card port being configured to receive a memory card wherein the memory card port is configured to electrically couple the processor to the memory card, the memory card port being configured to facilitate file sharing between the processor and the memory card, the memory card port being positioned beneath the plurality of universal serial bus ports, the memory card port being spaced from the bottom end of the housing;

a plurality of indicator lights being electrically coupled to the processor, each indicator light of the plurality of indicator lights being electrically coupled to a respective universal serial bus port of the plurality of universal serial bus ports, the processor being configured to illuminate an associated indicator light of the plurality of indicator lights when the respective universal serial bus port is electrically coupled to the respective external computing device, each indicator light of the plurality of indicator lights being positioned above the respective universal serial bus port of the plurality of universal serial bus ports, each indicator light of the plurality of indicator lights being centered above the respective universal serial bus port of the plurality of universal serial bus ports, each indicator light of the plurality of indicator lights being spaced from the respective universal serial bus port wherein each indicator light of the plurality of indicator lights is visible when the respective universal serial bus port is electrically coupled to the respective external computing device;

a turret being coupled to the housing, the turret extending upwardly from the top end of the housing, the turret being centrally positioned on the top end of the housing, the turret being octagonal, the turret having an upper face being distally positioned relative to the housing;

a fingerprint scanner being electrically coupled to the processor, the fingerprint scanner being positioned on the upper face of the turret, the fingerprint scanner being configured to capture an image of a fingerprint of a user, the processor being configured to compare the image of the fingerprint with a stored fingerprint identification file, the processor being configured to inhibit file sharing when the image differs from the stored fingerprint identification file;

a set of charge capacity lights being electrically coupled to the processor, the processor being configured to turn on all of the set of charge capacity lights when the internal power source is fully charged, the processor being configured to selectively turn off each of the set of charge capacity lights as the internal power source is drained, the set of charge capacity lights being aligned with each other on the upper face of the turret, the set of charge capacity lights being positioned proximate to the fingerprint scanner, the set of charge capacity lights being colored wherein the set of charge capacity lights includes a red light, an orange light, a yellow light, a yellow-green light, and a green light;

a cavity extending into the bottom end of the housing, the cavity being centered on the bottom end of the housing, the cavity having a threaded inner surface;

a base being couplable to the housing, the base being removably positionable on the bottom end of the housing, the base having a radius exceeding the radius of the housing wherein the base is configured to stabilize a position of the housing on a surface, the base including:

an upper wall, a lower wall, and a peripheral wall being coupled to and extending between the upper wall and the lower wall, the lower wall being planar wherein the lower wall is configured to rest on the surface when the base is coupled to the housing;

a groove extending into the upper wall to define a column being centered on the upper wall, the column having a radius being complementary to a radius of the cavity wherein the column is positionable within the cavity, the groove having a shape being complementary to a shape of the bottom end of the housing wherein the bottom end of the housing is positionable within the groove when the column is positioned within the cavity, the column having a threaded outer surface, the threaded outer surface being complementary to the threaded inner surface of the cavity extending into the bottom end of the housing wherein the base is threadably couplable to the housing;

an upper edge being positioned between the peripheral wall and the upper wall, the upper edge being beveled wherein the peripheral wall is angled extending upwardly and inwardly toward the upper wall and wherein the lower wall has a radius exceeding a radius of the upper wall; and a lower edge being positioned between the peripheral wall and the lower wall, the lower edge being squared wherein the lower wall is perpendicular to the peripheral wall.

\* \* \* \* \*